United States Patent
Phoenix et al.

[11] 3,910,286
[45] Oct. 7, 1975

[54] HARVESTING MACHINES
[75] Inventors: Lancelot Phoenix, Birmingham; John William Euclid Walker, Solihull; Alan George Mather, Sutton Coldfield, all of England
[73] Assignee: Lucas Electrical Company Limited, Birmingham, England
[22] Filed: Oct. 5, 1973
[21] Appl. No.: 403,889

[30] Foreign Application Priority Data
May 10, 1972 United Kingdom............ 45925/72

[52] U.S. Cl............................. 130/27 H; 56/10.2
[51] Int. Cl.².................. A01F 12/18; A01D 41/12
[58] Field of Search............ 56/10.2, DIG. 15, 14.6; 130/27 R, 27 H; 340/267 R, 271

[56] References Cited
UNITED STATES PATENTS

| | | |
|---|---|---|
| 2,639,569 | 5/1953 | Pasturczak.................... 56/DIG. 15 |
| 3,368,214 | 2/1968 | Swanson............................. 340/271 |
| 3,606,742 | 9/1971 | Wieneke et al..................... 56/10.2 |
| 3,626,402 | 12/1971 | Price............................. 340/267 R |

Primary Examiner—Russell R. Kinsey
Attorney, Agent, or Firm—Holman & Stern

[57] ABSTRACT

A harvesting machine has a rotor which lifts the crop from the ground and transfers it to an elevator which in turn supplys it to a concave and associated cylinder for separating the crop. The rotational speed of the cylinder is measured and a warning is given or a control effected, if the speed falls to a value such that the cylinder and concave are likely to jam. Alternatively, the speed signal is differentiated, and the deceleration of the cylinder is measured.

3 Claims, 2 Drawing Figures

HARVESTING MACHINES

BACKGROUND OF THE INVENTION

This invention relates to harvesting machines of the kind including a concave and associated cylinder for effecting the required separation of the crop, a rotor for lifting the crop from the ground, and an elevator for lifting the crop from the rotor to the cylinder.

SUMMARY OF THE INVENTION

The invention resides in a machine of the kind specified including means sensitive to the rotational speed of the cylinder for giving a warning or effecting a control in the event that the cylinder and concave are likely to jam.

In one arrangement, the means operates when the rotational speed of the cylinder falls below a predetermined value.

In another arrangement, the speed signal is differentiated to produce a deceleration signal, and the means operates when the deceleration exceeds a predetermined value.

BRIEF DESCRIPTION OF THE INVENTION

In the accompanying drawings,

FIG. 1 is a side view illustrating diagrammatically one form of harvesting machine to which the invention can be applied, and FIG. 2 is a block diagram illustrating one example of the invention.

DETAILED DESCRIPTION OF THE INVENTION

Figure 1:
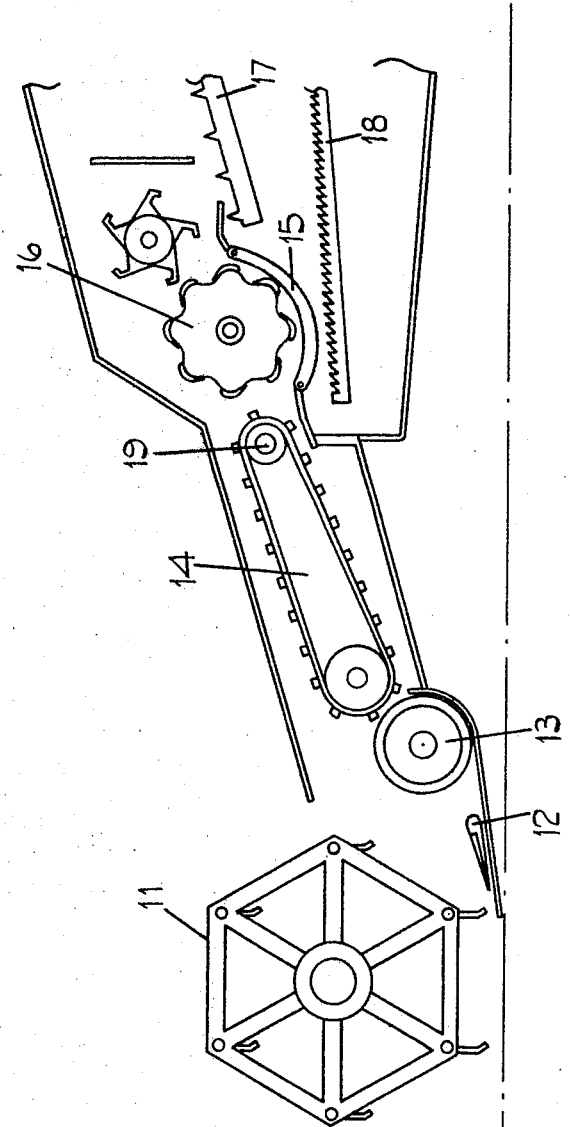

Referring to FIG. 1, there is provided a rotor 11 which is driven by the engine of the machine, and which picks up the crop from the ground. The crop is cut by a cutter 12 and fed to a shaft 13 having at each end thereof a helical thread, with the arrangement being such that the crop is fed from each end of the rotor towards the center of the machine. The crop is then picked up by fingers on an elevator 14, with the elevator 14 lifting the crop and depositing it between a conventional concave 15 and an associated cylinder 16. The concave 15 and cylinder 16 separate the grain, which is fed to a pair of grain conveyors 17, 18.

The elevator 14 is pivoted about its upper horizontal axis 19 so that the entire elevator 14 can lift, if necessary, to accommodate the crop trapped by the fingers of the elevator. All the components 11, 12, 13, 14 are mounted on a platform, the height of which can be adjusted to suit the crop being harvested.

Figure 2:
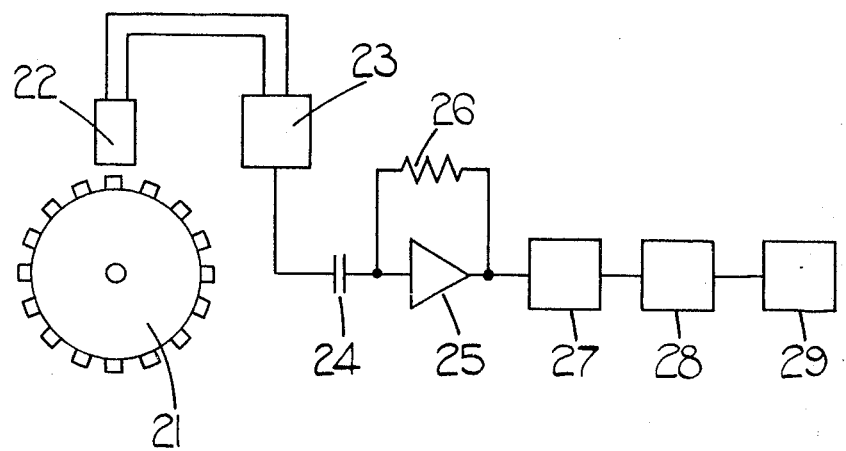

Referring to FIG. 2, the cylinder is driven by a shaft on which is also mounted a toothed wheel 21 having associated therewith some form of pick-up 22 which produces pulses at a rate representing the speed of rotation of the cylinder. The output from the pick-up 22 is fed to a frequency to voltage converter 23 which provides an input by way of a capacitor 24 to an operational amplifier 25 having a resistor 26 in its feedback circuit. The operational amplifier 25 differentiates the signal it receives from the converter 23, and provides an output to a comparator 27, the output from which is fed through an amplifier 28 to warning or control means 29.

In normal operation, the cylinder will rotate at a substantially constant speed, and so the differentiating circuit does not have any significant output, and the comparator 27 does not produce an output. However, if for any reason excess crop is fed to the cylinder and concave, then the cylinder will decelerate, and the amplifier 25 produces an output which is sensed by the comparator 27. When the deceleration signal reaches a value at which the cylinder and concave are likely to jam, the comparator 27 produces an output which is amplified by the amplifier 28 and fed to the means 29. The means 29 can simply operate some form of warning, or can effect any one or more of a number of controls, for example stopping the cylinder, lifting the table and stopping the machine.

The signal representing the speed of the cylinder can, of course, be obtained in a variety of ways, for example electro-magnetically or optically.

In a modification, instead of differentiating the speed signal, the speed signal is compared with a signal derived from a potentiometer associated with the drive mechanism to the cylinder, so that the actual cylinder speed is compared with the desired cylinder speed. If the actual speed falls below the desired speed by more than a predetermined amount, the control or warning means 29 is operated.

If desired, the arrangement may be such that the machine attempts to cure the jam automatically as soon as a potential jam is sensed. This can be done by operating means for adjusting the relative positions of the cylinder and concave, or by reversing the direction of rotation of the cylinder. Moreover, in some arrangements, it may be desirable, when a potential jam is detected, merely to give a warning to the operator, so that the operator can take steps to prevent the jam by suitable adjustment of the machine. If the operator fails to take the appropriate steps, then a control can be effected in any of the ways described above. There could be a simple time delay between giving the warning and effecting the control, so that if the fault is removed during the time delay the control is not effected. Alternatively, two signals could be obtained, one when a jam is imminent, at which point the control is effected, and one somewhat sooner, when the warning is given.

We claim:

1. A harvesting machine comprising, in combination, a concave and associated cylinder for effecting the required separation of the crop, a rotor for lifting the crop from the ground, an elevator for lifting the crop from the rotor to the cylinder, and means sensitive to the rotational speed of the cylinder for giving a warning or effecting a control in the event that the cylinder and concave are likely to jam including a differentiator to which the speed signal is applied, the differentiator producing an output representing the deceleration of the cylinder, and said means operating when the deceleration of the cylinder exceeds a predetermined value.

2. A machine as claimed in claim 1, in which two signals are obtained, one when a jam is imminent, at which point a control is effected, and one somewhat sooner, at which point a warning is given.

3. A harvesting machine comprising, in combination, a concave and associated cylinder for effecting the required separation of the crop, a rotor for lifting the crop from the ground, an elevator for lifting the crop from the rotor to the cylinder, said cylinder being provided with a toothed wheel, a pick-up associated with the toothed wheel for producing pulses at a rate representing the rotational speed of the cylinder, a voltage converter to which the output of the pick-up is fed, an operational amplifier to which an input of the computer is fed, a comparator, said amplifier differentiating the signal received from the convertor and providing an output to the comparator, an amplifier, and a warning or control means, with the output of the comparator being fed through the amplifier to the warning or control means.

* * * * *